March 11, 1947.  A. PARTIN  2,417,377
WRENCH
Filed Aug. 31, 1944  2 Sheets-Sheet 1
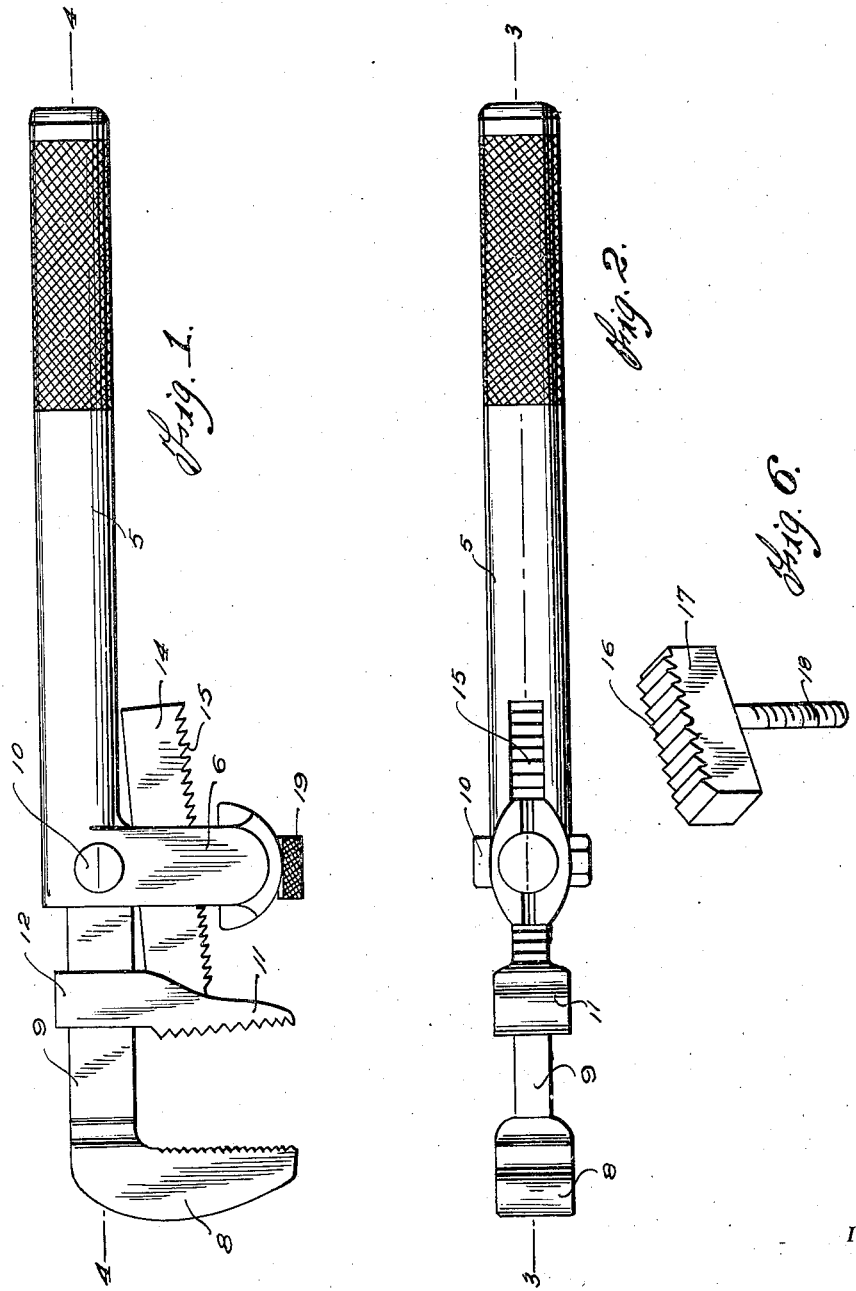
Inventor
Albert Partin
By Clarence A. O'Brien
and Harvey B. Jacobson
Attorneys March 11, 1947. A. PARTIN 2,417,377
WRENCH
Filed Aug. 31, 1944 2 Sheets-Sheet 2
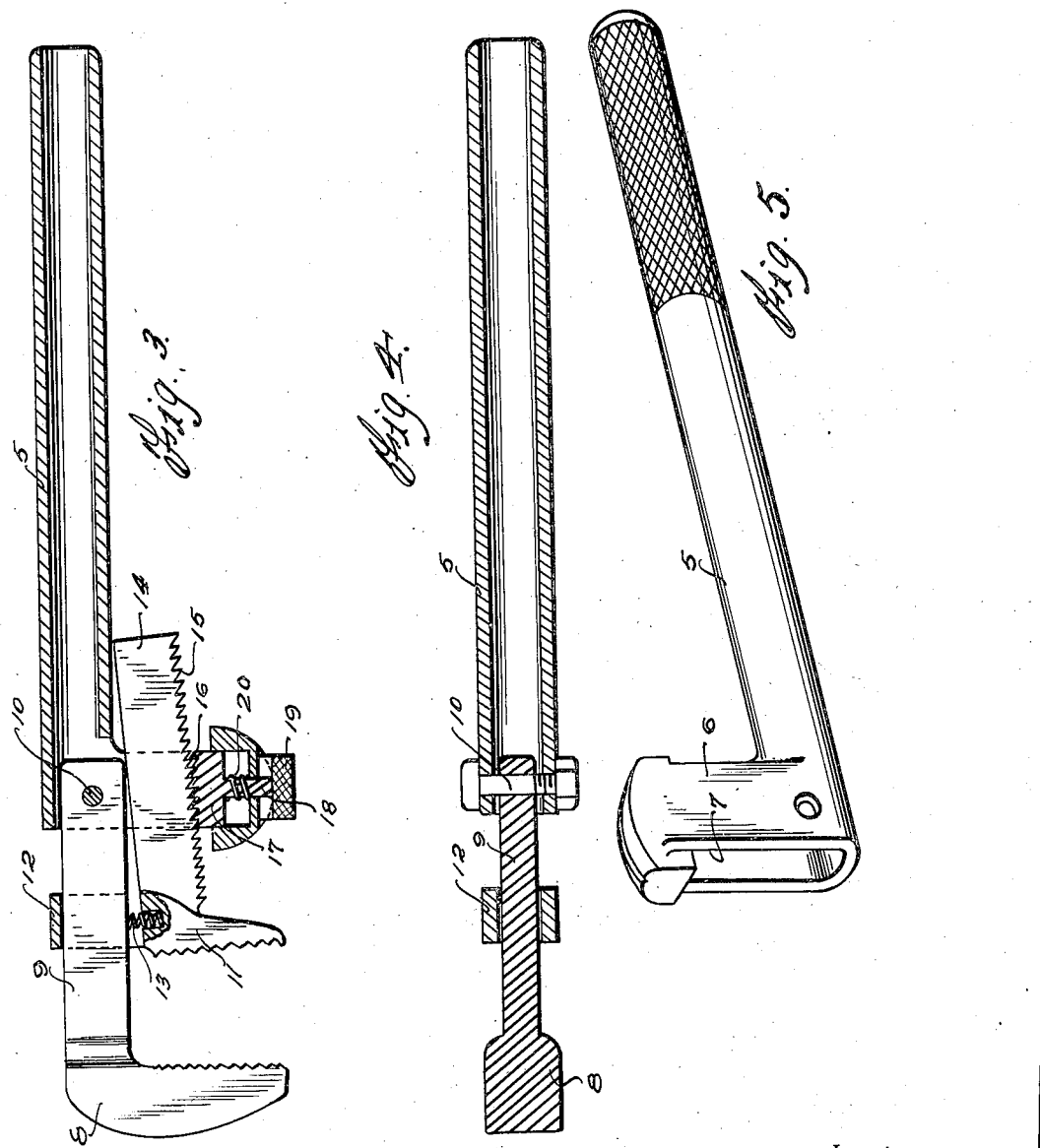
Inventor
Albert Partin
By Clarence A. O'Brien
and Harvey B. Jacobson
Attorneys Patented Mar. 11, 1947

2,417,377

UNITED STATES PATENT OFFICE 2,417,377

WRENCH

Albert Partin, Livingston, Mont.

Application August 31, 1944, Serial No. 552,061

1 Claim. (Cl. 81—126)

The present invention relates to new and useful improvements in wrenches embodying a sliding jaw and a relatively fixed jaw, and the invention has for its primary object to provide means for obtaining an approximate adjustment of the jaws by a sliding movement of one of the jaws and in which an effective gripping action of the jaws on the work is obtained by a bodily pivotal movement of the jaws on the shank of the wrench.

A still further object is to provide a device of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is a bottom plan view.

Figure 3 is a longitudinal sectional view, taken substantially on a line 3—3 of Figure 2.

Figure 4 is a longitudinal sectional view taken substantially on a line 4—4 of Figure 1.

Figure 5 is a perspective view of the handle, and

Figure 6 is a perspective view of the toothed dog for securing the movable jaw in its adjusted position.

Referring now to the drawings in detail, wherein for the purpose of illustration I have disclosed a preferred embodiment of the invention, the numeral 5 designates a handle preferably of tubular construction and having a guide 6 formed at one end thereof and projecting laterally from the handle and provided with an opening 7 extending longitudinally with respect to the handle.

A pivoted jaw 8 includes a shank 9 inserted in the front end of the handle 5 and pivoted thereto by means of a pin 10.

A slidable jaw 11 is formed on one edge with a collar 12 slidably mounted on the shank 9, the collar being of a size to provide free play of the shank 9 therein and yieldably held against the upper edge of the shank 9 by means of a coil spring 13 interposed between the upper edge of the jaw 11 and the lower edge of the shank 9 as shown to advantage in Figure 3 of the drawings.

The jaw 11 also includes a shank 14 having a toothed lower edge 15 adapted for engagement with the teeth 16 of a dog 17 positioned in the guide 6 and having a bolt 18 formed thereon slidably inserted through the bottom of the guide and secured in adjusted position therein by means of a nut 19. A coil spring 20 is mounted on the bolt 18 to yieldably urge the dog upwardly into engagement with the teeth of the shank 14 of the sliding jaw.

In the operation of the device the sliding jaw 11 is adapted for quick adjustment into gripping engagement with the work by sliding the shank 14 forwardly through the guide 6, the dog 17 retaining the movable jaw in its approximately adjusted position. A downward movement of the handle 5 will then cause a tight gripping engagement of the movable jaw 11 with the pivoted jaw 8 about the work to firmly secure the work between the jaws in a manner as will be apparent.

Having thus described the invention, what I claim is:

A wrench comprising a handle having a guide projecting laterally from one end thereof, a jaw including a shank pivotally attached to the handle at its end provided with the guide, a second jaw having a collar formed thereon slidably mounted on the shank of the first-named jaw, spring means interposed between the second jaw and the shank of the first jaw, said second jaw also including a shank having a toothed edge and slidably mounted in said guide, a dog having a threaded shank adjustably mounted in said guide, said dog being provided with teeth engaging the teeth of said shank and spring means in said guide engaging said dog to urge the teeth into engaged position.

ALBERT PARTIN.

REFERENCES CITED

The following references are of record in the file of this patent:

UNITED STATES PATENTS

| Number | Name | Date |
|---|---|---|
| 994,682 | Hodgson | June 6, 1911 |
| 1,163,845 | Oatman | Dec. 14, 1915 |
| 370,447 | Brown | Sept. 27, 1887 |
| 1,344,101 | Thomas | June 22, 1920 |
| 1,356,923 | Kirkpatrick | Oct. 26, 1920 |
| 982,956 | Hachmann et al. | Jan. 31, 1911 |